L. T. PAGE.
SHAPING ROLLS FOR HORSESHOE BARS.
APPLICATION FILED JAN. 8, 1914.
1,138,145.
Patented May 4, 1915.
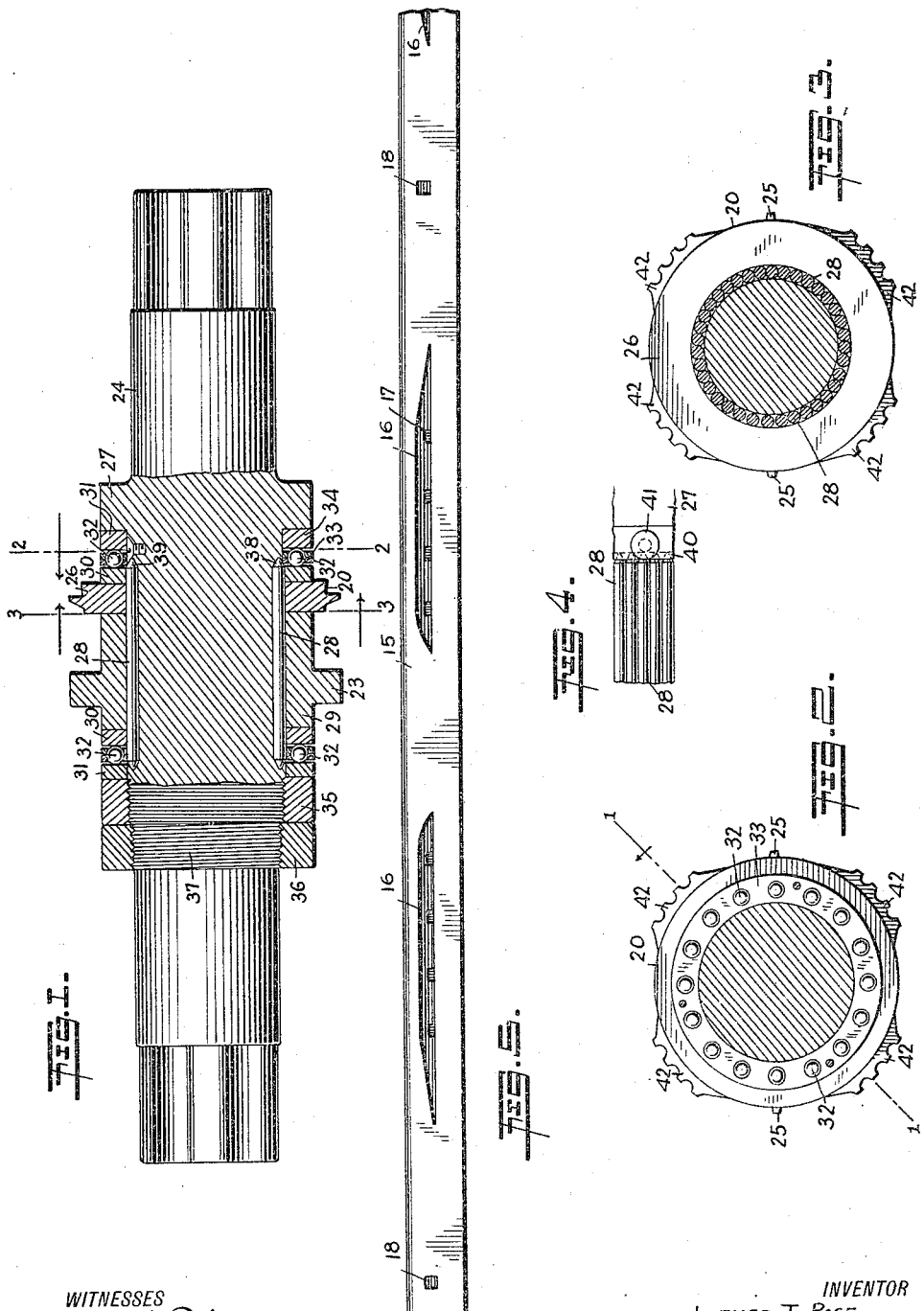
WITNESSES
INVENTOR
LUTHER T. PAGE
BY
ATTORNEYS

UNITED STATES PATENT OFFICE.

LUTHER THOMAS PAGE, OF WAREHAM, MASSACHUSETTS, ASSIGNOR OF ONE-HALF TO WILLIAM E. C. WARR, OF WAREHAM, MASSACHUSETTS.

SHAPING-ROLLS FOR HORSESHOE-BARS.

1,138,145.  Specification of Letters Patent.  Patented May 4, 1915.

Original application filed June 24, 1913, Serial No. 775,476. Divided and this application filed January 8, 1914. Serial No. 811,007.

*To all whom it may concern:*

Be it known that I, LUTHER T. PAGE, a citizen of the United States, and a resident of Wareham, in the county of Plymouth and State of Massachusetts, have invented new and Improved Shaping-Rolls for Horseshoe-Bars, of which the following is a full, clear, and exact description.

Among the principal objects which the present invention has in view are: to provide means for mechanically creasing and partially punching the bars from which horseshoes are subsequently made; to prevent the creeping or misregistering of the rolls with the bars and shoe-forming sections thereof; to reduce the friction offered by the bars to the rolls when passing therethrough; and to provide rolls of the character mentioned, having a simplified and economical construction.

In the drawings: Figure 1 is a side view, partly in section, of shaping rolls constructed and arranged in accordance with the present invention, the section being taken as one the line 1—1 in Fig. 2; Fig. 2 is a cross section taken as on the line 2—2 in Fig. 1; Fig. 3 is a cross section taken as on the line 3—3 in Fig. 1; Fig. 4 is a detail view showing a fragment of the roller bearings employed in conjunction with the rolls at present disclosed; Fig. 5 is a side view of a fragment of a metal bar after being passed through rolls constructed in accordance with the present invention.

The herein disclosed construction and claims relating thereto, constitute divisional subject matter disclosed in a co-pending application for Letters Patent, filed by me June 24, 1913, having Serial No. 775,476 for shaping rolls for horseshoe bars, which application has ultimated under date of February 10, 1914, in a Patent No. 1,086,933, to which patent cross-reference is here made.

Long bars of metal 15 have imparted thereto elongated depressions or creases 16, in which, when the horseshoe is secured to the hoof of the animal, the heads of the securing nails are disposed. The bottoms of the creases 16 are waved to provide thin sections 17, which are subsequently punched through to form holes for the nails by which the said shoes are secured to the hoofs of the animal. The creases 16 are arranged in pairs, as shown in Fig. 5 of the drawings. The various pairs are divided, and the median line between the divisions is marked on the bars by nicks 18. The nicks 18 are disposed so that when the bar 15 is separated into short segments, the ends having a portion of said nicks are shaped to form the heels of the completed shoe.

It will be understood that when the straight bar, either in the shape of short sections or complete bar lengths, is converted into shoes, these are shaped about the form by being bent edgewise, the openings of the creases 16 being in position to face the ground when the shoe is in service. What may be termed the final or finishing step in the operation is that where the bars are passed between a grooved or female roll and a die or male roll.

To accommodate the different sizes of shoes, the ring 20 is varied, different rings having different diameters, for the reason that it is an essential to the operation of the rings that the punch points 25 shall mark the nicks 18 in the bar 15 at proper intervals to form bars of the requisite length from which to construct horeshoes. The bars 15 are fed at a speed equal to the peripheral travel of a feed roll. As this speed may vary materially from the speed of the ring 20, it will be seen that a misregister of the punch points 25 may result, and that, further, due to the variation in the peripheral travel of the ring 20 as compared to that of the said feed roll, the bars 15 may be curled, necessitating a re-handling to straighten them. Further, it will be observed that the variation in peripheral travel of said ring and roll operates to produce friction.

To overcome the above objection, I form the ring 20 separately. The ring 20 is rotatable on the shaft 24, the end section 27 whereof is provided with an annular groove to form a bearing for small rollers 28. The rollers 28 likewise extend below the tubular body 29 of the ring 23. The rings 20 and 23 are spaced apart, as shown best in Fig. 1 of the drawings, and are held in position by rings or collars 30, forming end-thrust bearings for said rings. Corresponding bearing rings 31 are provided to receive the thrust of balls 32, which, in conjunction with holding rings 33, form a thrust bearing for the rings 20 and 23.

The end section 27 is provided with a shoulder to resist the thrust of a clamp nut 35 when exerted to press upon the ring 31 and intermediate members, including the rings 20 and 23. The nut 35 and a follower nut 36 are mounted upon a screw-threaded section 37 with which the shaft 24 is provided, as seen in the drawings.

The rollers 28 have each tapered ends 38, to receive which, undercut grooves are formed. The overhanging wall of one of said grooves is unbroken. The overhanging wall 40 of the opposite groove is parted to permit the passage downward of one of the rollers 28. The opening thus formed in the overhanging wall 40 is closed, when in service, by a screw 41, as seen best in Fig. 4 of the drawings. It will be observed that when thus constructed and mounted, the rings 20, and 23, are independently and freely rotatable on the shaft 24. When, now the bar 15 is under the ring 20, said bar operates to rotate said ring, the periphery whereof travels in unison with the engaged surface of said bar; or, in other words, the ring 20 rotates as an idler, at a speed uniform with the bar 15. By reason of this construction, the opposite surfaces of the bar travel at the same rate of speed, and the slippage, curling and misregistering of the points 25 above referred to, do not occur. Likewise, the die sections 42 with which the ring 20 is provided perfectly register with the bars 15. It will also be observed that the free running bearing formed by the rollers 28 and balls 32 reduces the friction or drag of the ring 20 and the tubular body 29 of the ring 23, thus reducing the required amount of manual exertion, and avoiding the consequent curling of the bar 15.

Claims.

1. In combination; a free-running shaft; a free-running ring mounted on said shaft and suitably provided with die sections; a tubular body freely mounted on said shaft, having a guide flange spaced apart from said ring; and a plurality of rollers surrounding said shaft and interposed between the same and said ring and said tubular body.

2. In combination; a free-running shaft; a free-running ring mounted on said shaft and suitably provided with die sections; a tubular body freely mounted on said shaft, having a guide flange spaced apart from said ring; a plurality of rollers surrounding said shaft and interposed between the same and said ring and said tubular body; and a plurality of thrust bearings, embodying bearing balls disposed at opposite sides of said ring and tubular body to maintain the working alinement of the same.

In testimony whereof I have signed my name to this specification in the presence of two subscribing witnesses.

LUTHER THOMAS PAGE.

Witnesses:
WILLIAM E. C. WARR,
JOSIAH L. ELDREDGE.